US008556651B1

(12) United States Patent
Heitmann et al.

(10) Patent No.: US 8,556,651 B1
(45) Date of Patent: Oct. 15, 2013

(54) SYSTEM AND METHOD FOR VERIFYING ASSEMBLY OF A CONNECTOR

(75) Inventors: Michael C. Heitmann, Shelby Township, MI (US); Bernard J. Slovan, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/453,267

(22) Filed: Apr. 23, 2012

(51) Int. Cl.
*H01R 3/00* (2006.01)

(52) U.S. Cl.
USPC ........................................................ 439/489

(58) Field of Classification Search
USPC .................. 439/489, 488, 490, 535, 536, 523
See application file for complete search history.

(56) References Cited

U.S. PATENT DOCUMENTS

| 2,015,698 | A | * | 10/1935 | Tiffany | 200/317 |
|---|---|---|---|---|---|
| 2,863,038 | A | * | 12/1958 | Lombardo | 362/20 |
| 6,910,920 | B2 | * | 6/2005 | Su | 439/606 |
| 6,945,826 | B2 | * | 9/2005 | Wise | 439/693 |
| 6,984,146 | B1 | * | 1/2006 | Boudreau | 439/488 |
| 7,004,595 | B1 | * | 2/2006 | Stoddard | 362/95 |
| 7,036,948 | B1 | * | 5/2006 | Wyatt | 362/95 |
| 8,393,747 | B2 | * | 3/2013 | Kevelos et al. | 362/95 |
| 8,444,309 | B2 | * | 5/2013 | Jansen et al. | 362/555 |
| 2001/0034156 | A1 | * | 10/2001 | Yamane | 439/492 |

\* cited by examiner

*Primary Examiner* — Neil Abrams
*Assistant Examiner* — Phuongchi T Nguyen
(74) *Attorney, Agent, or Firm* — Cantor Colburn LLP

(57) ABSTRACT

A connector assembly comprises a male connector and a female connector. The female connector includes a housing having an inner surface defining a cavity configured to receive the male connector. The male connector includes a housing having an outer surface configured to enable the male connector to be at least partially inserted into the cavity. The outer surface comprises a background region and an indicator region configured to emit a detectable quantity of light that is distinguishable from light emitted by the background region of the male connector and from light emitted by the housing of the female connector. The indicator region is shaped and positioned to be at least partially exposed whenever the male connector is not fully assembled into the female connector and to be completely within the housing of the female connector whenever the male connector is fully assembled into the female connector.

20 Claims, 2 Drawing Sheets

SYSTEM AND METHOD FOR VERIFYING ASSEMBLY OF A CONNECTOR

FIELD OF THE INVENTION

The subject invention relates to connector assemblies and more specifically to a system and method for verifying assembly of a connector assembly.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In a production facility for assembling appliances, computers, motor vehicles, or other products comprising components that must be reliably joined with electrical, hydraulic, pneumatic, optical, mechanical, or other connections, it is important to be able to verify that all of the connections have been made reliably. For example, where the coupling involves an electrical connection, it is important to be able to reliably and efficiently ascertain whether the electrical connectors are fully seated. Similarly, where the coupling involves a hydraulic, pneumatic or optical connection, it is important to be able to reliably and efficiently ascertain whether the hydraulic, pneumatic or optical connectors are fully seated. When electrical connectors are not fully seated, the faultily connected subassemblies may initially operate satisfactorily, but may fail prematurely in service.

To avoid faulty connections, many conventional connectors incorporate position assurance features such as male tabs that cooperate with corresponding female slots or ridges that cooperate with slots or lock tangs that snap into place when the connector is fully and properly seated. Conventional assembly processes associated with such snap-lock features may require an assembly technician to apply a tension force to each connector assembly following assembly so as to verify that the assembly is fully seated. One such process is known as "Push-Click-Tug-Verify."

Unfortunately, manual processes such as Push-Click-Tug-Verify can be labor intensive, tedious, and relatively unreliable. In a motor vehicle, there may be hundreds or even thousands of connections to make, causing the implementation of labor-intensive processes like Push-Click-Tug-Verify cost-prohibitive to implement except in limited situations. In addition, the cost of incorporating such position assurance or locking features on connectors can become significant when implemented broadly.

Therefore, it is desirable to have an improved system and method for verifying proper assembly of connectors such as electrical connectors, hydraulic connectors, pneumatic connectors and optical connectors.

SUMMARY OF THE INVENTION

In one exemplary embodiment of the invention, a connector assembly comprises a male connector and a female connector. The female connector includes a housing having an inner surface defining a cavity configured to receive the male connector. The male connector includes a housing having an outer surface configured to enable the male connector to be at least partially inserted into the cavity. The male connector is configured to mate with the female connector when inserted into the cavity. The outer surface comprises a background region and an indicator region, the indicator region being configured to emit a detectable quantity of light that is distinguishable from light emitted by the background region of the male connector and from light emitted by the housing of the female connector. The indicator region is shaped and positioned such that it is at least partially exposed whenever the male connector is not fully assembled into the female connector and to be positioned completely within the housing of the female connector whenever the male connector is fully assembled into the female connector.

In another exemplary embodiment of the invention, a method for verifying assembly of an electrical connector comprises at least partially assembling a connector assembly comprising a male connector and a female connector and observing light emitted from the connector assembly. An indicator region is disposed on an outer surface of the male connector in such a way, and having such character, that the indicator region emits a detectable quantity of light that is distinguishable from other sources of light in the vicinity of the connector assembly. The female connector is configured so as to expose at least a portion of the indicator region, and thereby permits light from the indicator region to be emitted outside the connector assembly whenever the male connector is not fully assembled into the female connector. The female connector being configured so as to obscure the indicator region, and thereby prevent light from the indicator region from being emitted outside the connector assembly, whenever the male connector is fully assembled into the female connector.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
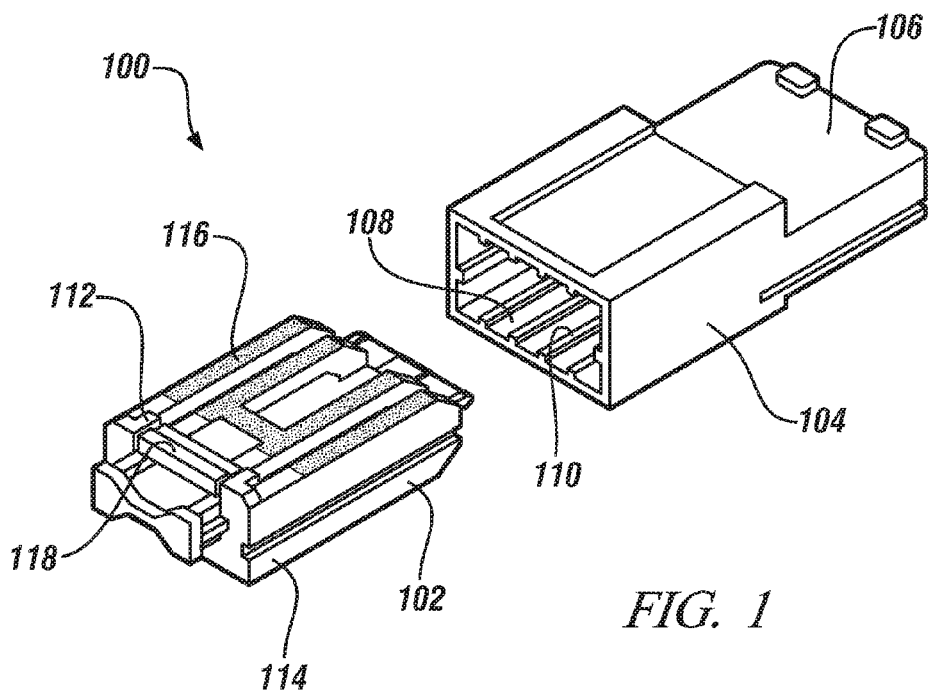
FIG. 1 is a perspective view of an exemplary connector assembly in an unmated state according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

In accordance with an exemplary embodiment of the invention, the present disclosure provides an improved system and method for verifying proper assembly of connectors such as electrical connectors, hydraulic connectors, pneumatic connectors and optical connectors. FIG. 1 shows an exemplary connector assembly 100 comprising a male connector 102 and a mating female connector 104. The female connector 104 includes a housing 106 having an inner surface 108 that defines a cavity 110 that is configured to receive the male connector 102, which is configured to mate with the female connector 104 when inserted fully into the cavity 110. The male connector also includes a housing 112 that has an outer surface 114 that is configured so as to be capable of being at least partially inserted into the cavity 110 defined by the inner surface 108 of the housing 106 of the female connector 104.

In an exemplary embodiment, the male connector 102 and the female connector 104 may be configured to carry electrical terminals (not shown) that are positioned and configured so as to reliably provide durable electrical coupling with one another when the male connector 102 is fully seated within the female connector 104. For example, one of the terminals might be a male blade terminal while the other terminal might be a spring-loaded female box terminal sized to mate with the male blade terminal. The male blade terminal would be positioned within either the male or the female connector, and the spring-loaded female box terminal would be positioned within the other of the male or the female connector. Each terminal would be positioned within its respective connector so that when the male connector 102 is fully seated within the female connector 104, the terminals are properly mated. It should be appreciated that other configurations are possible such that the male connector 102 and the female connector 104 may facilitate hydraulic coupling, pneumatic coupling, optical coupling or any other type of coupling where it is important to provide reliable mating between connectors.

One or more indicator region 116 is disposed or defined on the outer surface 114 of the housing 112 of the male connector 102 and is configured so as to emit a detectable quantity of light that is distinguishable from other sources of light in the vicinity of the connector assembly 100. The indicator region 116 is adjacent to, and distinct relative to, a background region 118 of the outer surface 114 of the housing 112 of the male connector 102. The indicator region 116 is configured to emit light having a component wavelength that differs substantially from light emitted by the background region 118 of the male connector or by the housing 106 of the female connector.

In one exemplary embodiment, the indicator region 116 comprises a mark or coating that is configured to emit visible light when exposed to invisible light (i.e., to fluoresce or glow). More specifically, such a mark or coating may be configured to emit light having a wavelength greater than approximately 400 nm (e.g., between approximately 440 nm and approximately 500 nm) when exposed to light having a wavelength less than approximately 400 nm (e.g., between approximately 350 nm and approximately 390 nm).

In another exemplary embodiment, the indicator region 116 is configured to emit visible light in any characteristic wavelength that is distinguishable from background light. For example, where the assembled product emits a combination of colors including black and blue and silver, the indicator region 116 may be configured to emit red or yellow or orange light.

In an exemplary embodiment, the indicator region 116 comprises a fluorescent material imbedded in or formed in the housing 112 so as to be exposed as the indicator region and to thereby provide the desired light-emitting properties. In another exemplary embodiment, the indicator region 116 comprises a paint of a color that contrasts with the color of the surrounding housing of the male electrical connector.

In an exemplary embodiment, the indicator region 116 is configured to emit light having a characteristic that is indicative of a specific identity of the connector or type of the connector or a characteristic of the connector. This may be particularly useful where many connections are to be evaluated at the same time.

In an exemplary embodiment, the indicator region 116 is shaped and positioned such that it is at least partially exposed whenever the male connector 102 is not fully assembled into the female connector 104. Put another way, the housing 106 of the female connector 104 is configured so as to expose at least a portion of the indicator region 116 whenever the male connector 102 is not fully assembled into the cavity 110 of the female connector 104.

In addition, the indicator region 116 is shaped and positioned so as to be positioned completely within the housing 106 of the female connector 104 whenever the male connector 102 is fully assembled into the female connector 104. Put another way, the housing 106 of the female connector 104 is configured so as to shield the entire indicator region 116 from exposure whenever the male connector 102 is fully assembled into the female connector 104.

Figure 2:
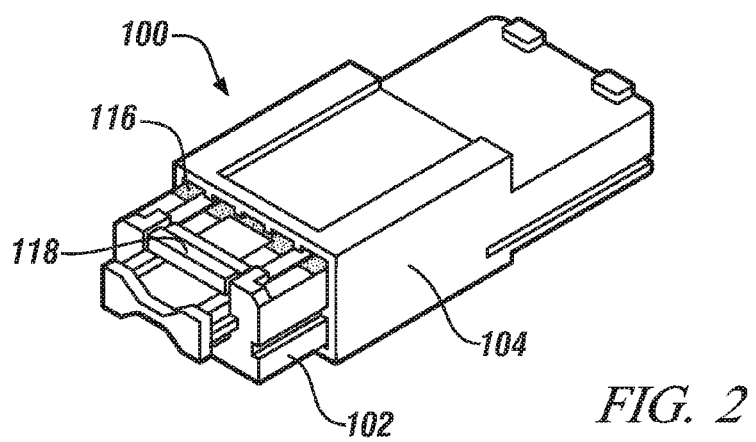
FIG. 2 is a perspective view of an exemplary connector assembly in a partially mated state according to the present disclosure.
Figure 3:
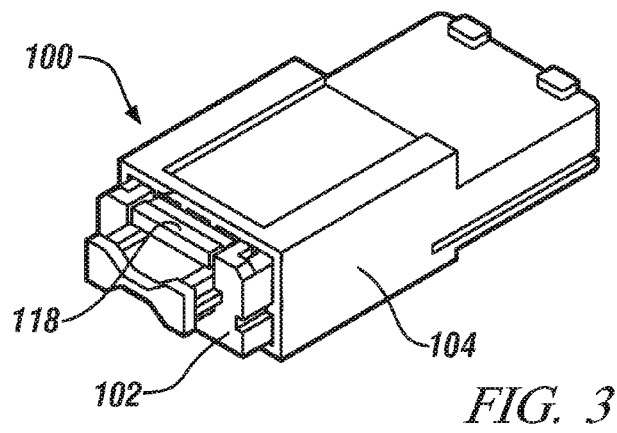
FIG. 3 is a perspective view of an exemplary connector assembly in a fully mated state according to the present disclosure.

As shown in FIG. 1, the male connector 102 is in an unmated state such that the indicator region 116 is fully exposed. As shown in FIG. 2, the male connector 102 is in a partially mated state within the cavity 110 of the female connector 104 such that the indicator region 116 remains partially exposed. As shown in FIG. 3, the male connector 102 is completely mated with the female connector 104 (i.e., is fully or properly seated within the cavity 110 of the female connector 104) such that the indicator region 116 is positioned completely within the housing 106 of the female connector 104.

As a result, the ability or inability to detect light emitted from the indicator region 116 may be used to determine whether the male connector 102 is in an unmated or partially mated state within the housing 106 of the female connector 104, as shown in FIG. 1 or FIG. 2, or, alternatively, whether the male connector 102 is in a fully mated state (i.e., properly seated within the cavity 110 of the female connector 104) as shown in FIG. 3.

Where the indicator region 116 is configured to emit visible light when exposed to invisible light, the connector assembly 100 may be exposed to invisible light, such as ultraviolet light while observing the connector assembly 100 for evidence of fluorescence. Such a process may be particularly useful at various stages of an assembly process such that many connections may be verified at one time using an automated light detection apparatus that may be more sensitive and/or reliable and/or durable and/or efficient and/or cost-effective and/or safe than relying upon the human eye of a visual inspector or even the Push-Click-Tug-Verify method.

Figure 4:
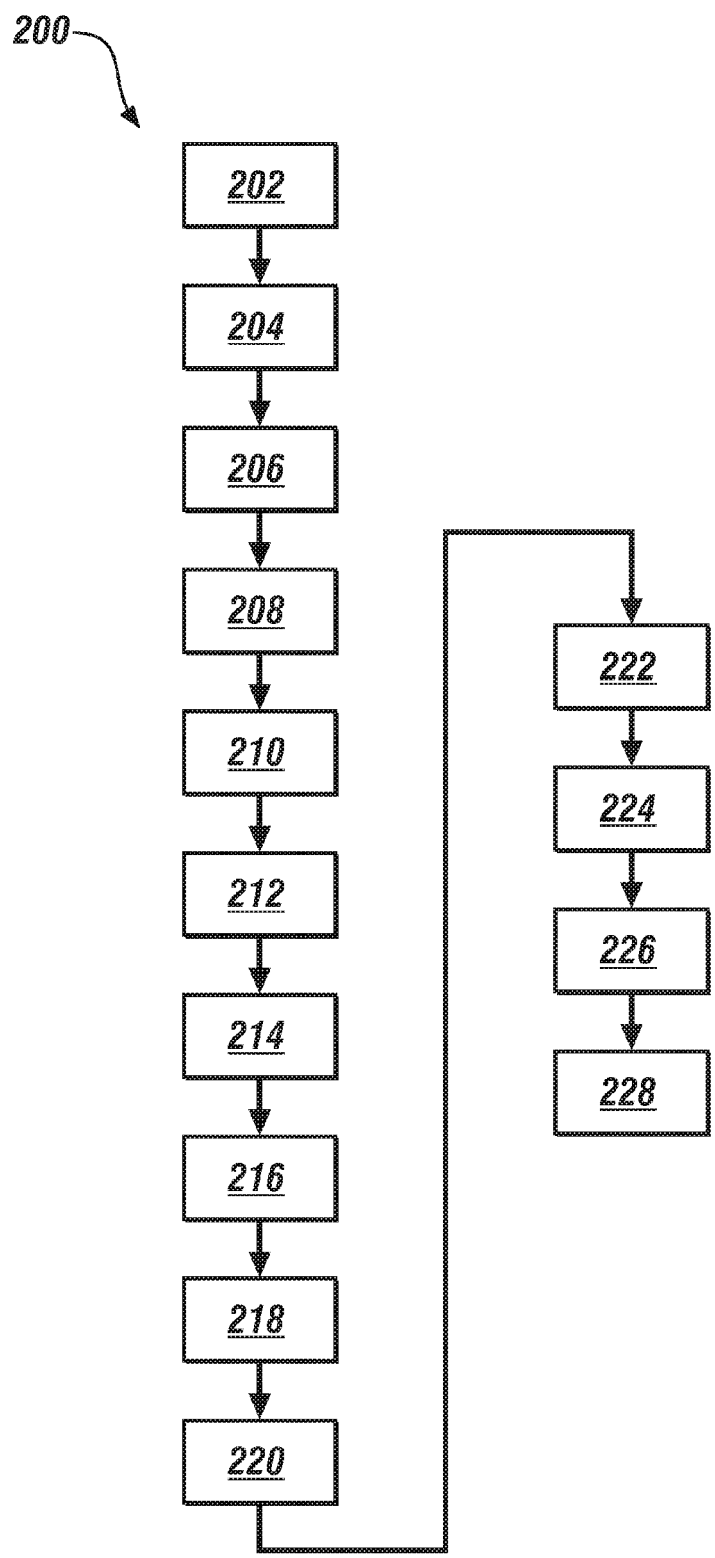
FIG. 4 is a process flow diagram illustrating an exemplary method according to the present disclosure.

FIG. 4 is a flow chart showing an exemplary process 200 for verifying assembly of an electrical connector. In an exemplary embodiment, a connector assembly is provided (step 202) comprising a male connector and a mating female connector. An indicator region is disposed (step 204) on an outer surface of the male connector in such a way, and having such character, that the indicator region emits (step 206) a detectable quantity of light that is distinguishable from other sources of light in the vicinity of the connector assembly. The female connector exposes (step 208) at least a portion of the indicator region, and thereby permits light from the indicator region to be emitted outside the connector assembly (step 210), whenever the male connector is not fully assembled into the female connector. The female connector obscures (step 212) the indicator region, and thereby prevents light from the indicator region from being emitted outside the connector assembly (step 214), whenever the male connector is fully assembled into the female connector.

In an exemplary embodiment, the connector assembly is exposed to invisible light, such as ultraviolet light (step 216), while observing (step 218) the connector assembly for evidence of fluorescence. In accordance with this embodiment, the indicator region is configured to emit visible light when exposed to invisible light. It may be particularly advantageous to perform steps 216 and 218 at various stages of an assembly process such that many connections may be verified at one time using an automated light detection apparatus that may be more sensitive and/or reliable and/or durable and/or efficient and/or cost-effective and/or safe than relying upon the human eye of a visual inspector or even the Push-Click-Tug-Verify method. Upon detection (step 220) of light emitted from an indicator region, remedial action may be undertaken. Analysis of the emitted light may be undertaken (step 222) so as to correlate specific characteristics of the emitted light to specific connector assemblies associated with the specific light characteristics. As a result, an automated apparatus may be enabled to provide detailed instructions (step 224) to enable a technician to efficiently identify (step 226) and correct (step 228) the faulty connection.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments that are explicitly disclosed, but that the invention will include all embodiments falling within the scope of the application.

What is claimed is:

1. A connector assembly comprising:
   a male connector; and
   a female connector;
   the female connector including a housing having an inner surface defining a cavity configured to receive the male connector;
   the male connector including a housing having an outer surface configured to enable the male connector to be at least partially inserted into the cavity;
   the male connector being configured to mate with the female connector when inserted into the cavity;
   the outer surface comprising a background region and an indicator region, the indicator region being configured to emit a detectable quantity of light that is distinguishable from light emitted by the background region of the male connector and from light emitted by the housing of the female connector;
   wherein the indicator region is shaped and positioned such that it is at least partially exposed whenever the male connector is not fully assembled into the female connector; and
   wherein the indicator region is shaped and positioned so as to be positioned completely within the housing of the female connector whenever the male connector is fully assembled into the female connector.

2. The connector assembly of claim 1, wherein the indicator region is configured to emit light having a wavelength greater than approximately 400 nm when exposed to light having a wavelength less than approximately 400 nm.

3. The connector assembly of claim 1, wherein the indicator region is configured to emit visible light when exposed to invisible light.

4. The connector assembly of claim 1, wherein the indicator region comprises a fluorescent material imbedded in the housing of the male connector.

5. The connector assembly of claim 1, wherein the indicator region is configured to emit light having a characteristic that is indicative of an identity of the connector.

6. The connector assembly of claim 1, wherein the indicator region is configured to emit light having a characteristic that is indicative of a type of the connector.

7. The connector assembly of claim 1, wherein the housing of the female connector is configured so as to expose at least a portion of the indicator region whenever the male connector is not fully assembled into the cavity of the female connector.

8. The connector assembly of claim 1, wherein the housing of the female connector is configured so as to shield the entire indicator region from exposure whenever the male connector is fully assembled into the female connector.

9. The connector assembly of claim 1, wherein the male connector and the female connector are configured to carry electrical terminals that are positioned and configured so as to reliably provide durable electrical coupling with one another when the male connector is fully seated within the female connector.

10. The connector assembly of claim 1, wherein the male connector and the female connector are configured to facilitate hydraulic coupling.

11. The connector assembly of claim 1, wherein the male connector and the female connector are configured to facilitate pneumatic coupling.

12. The connector assembly of claim 1, wherein the male connector and the female connector are configured to facilitate optical coupling.

13. The connector assembly of claim 1, wherein the male connector and the female connector are configured to lock together.

14. The connector assembly of claim 1, wherein the indicator region is configured to emit visible light when exposed to invisible light.

15. The connector assembly of claim 14, wherein the indicator region comprises a coating that is configured to emit a detectable quantity of light that is distinguishable from other sources of light in the vicinity of the connector assembly.

16. A method for verifying assembly of a connector assembly comprising:
   disposing an indicator region on an outer surface of a male connector in such a way, and with such character, that the indicator region emits a detectable quantity of light that is distinguishable from other sources of light in the vicinity of the connector assembly,
   configuring a female connector to expose at least a portion of the indicator region, and thereby permit light from the indicator region to be emitted outside the connector assembly, whenever the male connector is not fully assembled into the female connector and to obscure the indicator region, and thereby prevent light from the indicator region from being emitted outside the connector assembly, whenever the male connector is fully assembled into the female connector;
   at least partially assembling the connector assembly by inserting the male connector at least partially into the female connector; and
   observing light emitted from the connector assembly.

17. The method of claim 16, further comprising exposing the connector assembly to invisible light while observing the connector assembly for evidence of fluorescence.

18. The method of claim 16, further comprising determining an identity of the connector assembly based on a characteristic of the light emitted from the connector assembly.

19. The method of claim 16, further comprising determining a type of the connector assembly based on a characteristic of the light emitted from the connector assembly.

20. The method of claim 16, further comprising providing instructions configured to facilitate proper assembly of the connector assembly.

* * * * *